(12) United States Patent
Wescott

(10) Patent No.: US 8,147,270 B1
(45) Date of Patent: Apr. 3, 2012

(54) CORD MANAGEMENT METHOD AND SLEEVE FOR ENDS OF Y-SHAPED CORDS

(76) Inventor: Jeffrey Wescott, San Francisco, CA (US)

( * ) Notice: Subject to any disclaimer, the term of this patent is extended or adjusted under 35 U.S.C. 154(b) by 77 days.

(21) Appl. No.: 12/877,521

(22) Filed: Sep. 8, 2010

Related U.S. Application Data

(60) Provisional application No. 61/245,318, filed on Sep. 24, 2009.

(51) Int. Cl.
*H01R 13/72* (2006.01)

(52) U.S. Cl. .......... 439/501; 381/380; 381/378; 24/130; 24/115 R; 174/135

(58) Field of Classification Search .............. 381/380, 381/374, 378, 370; 439/501; 24/130, 115 R; 174/135
See application file for complete search history.

(56) References Cited

U.S. PATENT DOCUMENTS

| | | | |
|---|---|---|---|
| 2,795,641 A | 6/1957 | Rowell | |
| 3,984,645 A | 10/1976 | Kresch | |
| 4,095,871 A * | 6/1978 | Holte | 439/501 |
| 4,939,778 A | 7/1990 | Tomberlin | |
| 4,942,617 A | 7/1990 | Boylan | |
| 5,339,461 A | 8/1994 | Luplow | |
| 5,368,247 A | 11/1994 | Young | |
| 5,439,390 A | 8/1995 | Raynor et al. | |
| 5,511,120 A | 4/1996 | Hirata et al. | |
| 5,619,569 A | 4/1997 | McVay | |
| 5,684,883 A | 11/1997 | Chen | |
| 5,720,627 A * | 2/1998 | Gillbrand et al. | 439/501 |
| 5,724,667 A | 3/1998 | Furuno | |
| 5,832,098 A | 11/1998 | Chen | |
| 6,371,401 B1 | 4/2002 | Ketterer | |
| 6,480,611 B2 | 11/2002 | Hashimoto et al. | |
| 6,698,560 B2 | 3/2004 | Reardon et al. | |
| 6,731,956 B2 | 5/2004 | Hanna et al. | |
| 7,131,167 B2 | 11/2006 | Stagnaro | |
| 7,214,092 B1 * | 5/2007 | Platt | 439/501 |
| 7,416,099 B2 | 8/2008 | deLeon | |
| 7,599,509 B2 * | 10/2009 | Ito | 381/384 |
| 2004/0091128 A1 | 5/2004 | Park | |
| 2005/0069147 A1 | 3/2005 | Pedersen | |
| 2005/0123164 A1 | 6/2005 | Yao et al. | |
| 2007/0160252 A1 | 7/2007 | Wang et al. | |
| 2007/0180665 A1 | 8/2007 | Sween et al. | |
| 2008/0089544 A1 | 4/2008 | Ito | |
| 2008/0101633 A1 | 5/2008 | Ledbetter et al. | |
| 2008/0159759 A1 | 7/2008 | Park | |
| 2008/0301913 A1 | 12/2008 | Alfarone | |
| 2008/0317274 A1 | 12/2008 | Kim | |
| 2009/0010461 A1 | 1/2009 | Klinghult et al. | |
| 2009/0041284 A1 | 2/2009 | Tanaka et al. | |

* cited by examiner

*Primary Examiner* — Gary F. Paumen
(74) *Attorney, Agent, or Firm* — Goldstein Law Offices, P.C.

(57) ABSTRACT

A sleeve for storing a Y-shaped cord without tangling and a method of managing a Y-shaped cord by grouping a plurality of the cord loose ends in the sleeve, each into a separate portion, forming a closed loop. The sleeve is triangular-shaped, having a conical sidewall with an open top end and an open bottom end. Inside the sleeve, the ends of the cord are separated by at least one fastener. The closed loop makes it less likely that the cord will tangle with other objects or with itself. If the cord does tangle when in the closed loop, the topology of the closed loop makes untangling the cord simpler and quicker than if the ends were loose. When using the Y-cord, the sleeve remains on the cord, not interfering with the cord functioning and not easily lost.

20 Claims, 2 Drawing Sheets

CORD MANAGEMENT METHOD AND SLEEVE FOR ENDS OF Y-SHAPED CORDS

CROSS-REFERENCE TO RELATED APPLICATIONS

This application is a continuation-in-part of provisional patent application, Ser. No. 61/245,318, filed in the United States Patent Office on Sep. 24, 2009.

BACKGROUND OF THE INVENTION

The invention relates generally to a cord management method and a sleeve for preventing the entanglement of a Y-shaped cord. More particularly, the invention relates to the cord management method of grouping and separating a plurality of ends of the Y-shaped cord that employs a sleeve that separates the plurality of ends of the Y-shaped cord, such as found on a set of earphones, game controllers, or data cables, preventing the Y-shaped cord from getting tangled with itself and other objects while in storage.

Modern electronics frequently use portable Y-shaped cords. Prominent examples of Y-cords (Y-shaped cords) are: earbud earphones, in-ear-monitor headphones, game controllers such as with the Wii® system, (Wii® is the registered trademark of Nintendo Of America Inc. Corp., Redmond, Wash.) PS2® Splitter Y cable (PS2® is the registered trademark of Sony Computer Entertainment Inc., Corp., Tokyo, Japan), and the USB-2 (Universal Serial Bus) Male Y-cable. These light flexible Y-cords are particularly desirable for portable applications, which means they are frequently stored in bags, pouches, or the bottom of drawers, where they can become entangled with other objects in the surrounding area, or tangled with the other ends of the same Y-cord. Daily new electronic devices are introduced to the consumer market that require the use of a Y-cord. Additionally, other functional electronic parts are often added in the middle of the Y-cord, such as a microphone, so that the Y-cord must be completely disentangled before using. Because personal electronic devices are so popular, people will own multiple sets of Y-cords, generally stored in the same place, that become entangled like a proverbial nest of wire hangers. As a result, users are frequently frustrated by having to spend several minutes detangling the Y-cord before it can be used.

Existing attempts to prevent Y-cord entanglement focus on isolating, capturing, or otherwise taking up the excess cable in the middle of the Y-cord, such as the device taught in U.S. Pat. No. 7,599,509 These existing practices require the user to wrap the middle portion of the Y-cord around some other object, either the listening device itself, such as an iPod® (iPod® is the registered trademark of APPLE Inc., Cupertino, Calif. 95014), a mobile phone, or similar device, or an external object, such as a capstan, a spindle or a similar device. The existing methods are both cumbersome and time consuming, requiring the user to wrap the cord up and then unwrap it for each use. They add either extra bulk and weight, in the case of wrapping the cord around an external object, or else render the device itself unusable, for example, by blocking the viewing area on an iPod® with the cord.

Many others have proposed reels that are incorporated into the electronic device or are externally located on the cord itself. Generally, these reels are self-retracting and are designed for a single cord, such as a single earbud cord and not a cord that includes multiple cords. However, no reeling device effectively manages the Y-shaped cord because it will either reel in the segments of the cord containing the earbuds together, possibly entangling them in the process, or allow one portion of the Y-cord to dangle.

While these units may be suitable for the particular purpose employed, or for general use, they would not be as suitable for the purposes of the present invention as disclosed hereafter.

SUMMARY OF THE INVENTION

It is an object of the invention to produce a sleeve for storing a Y-cord (Y-shaped cord) without wrapping around an external device such as a capstan, a spindle, a retracting reel or similar device. Accordingly, the sleeve groups a plurality of loose ends of the Y-cord to form a closed loop, so that a remaining portion of the cord between the loose ends is free and untangled without wrapping around a capstan, a spindle or a similar device.

It is a further object of the invention to produce a sleeve for storing a Y-cord without tangling without wrapping around an electronic device and interfering with the electronic device functioning. Accordingly, the sleeve groups a plurality of loose ends of the Y-cord to form a closed loop, so that a remaining portion of the cord between the loose ends is free without obstructing the electronic device by wrapping the Y-cord around the electronic device.

It is another object of the invention to produce a sleeve for storing Y-cords without tangling. Accordingly, the sleeve groups the plurality of ends of the Y-cord to form a closed loop and separates the ends inside the sleeve so that the remaining cord is loose, untangled and in a closed loop that cannot wrap around itself or other objects.

It is yet a further object of the invention to produce a sleeve for storing Y-cords that quickly untangles minor tangling. Accordingly, the sleeve groups each of a plurality of ends of the Y-cord to form a closed loop that quickly untangles if minor tangling has occurred.

It is yet another object of the invention to produce a sleeve for storing Y-cords that stays with the Y-cord when the Y-cord is in use, so that it is not easily misplaced. Accordingly, the sleeve sits at a junction of the Y-cord, so that the sleeve remains at hand, not interfering with the cord functioning and not easily lost.

The invention is a sleeve for storing a Y-shaped cord without tangling, by grouping a plurality of ends of the cord to form a closed loop and separating each into a separate portion of the sleeve and a method for using and storing the Y-shaped cord in the sleeve. The sleeve is triangular-shaped, having a conical sidewall with an open top end and an open bottom end. Inside the sleeve, the ends of the cord are separated by at least one fastener. Grouping the cord ends together in the sleeve to form a closed loop makes it less likely that the cord will tangle with other objects or with itself. If the cord does tangle when in the closed loop, the topology of the closed loop makes untangling the cord simpler and quicker than if the ends were loose. When the y-shaped cord is in use, the sleeve sits at a junction of the y-shaped cord, so that the sleeve remains at hand, not interfering with the cord functioning and not easily lost.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figures 1, 2:
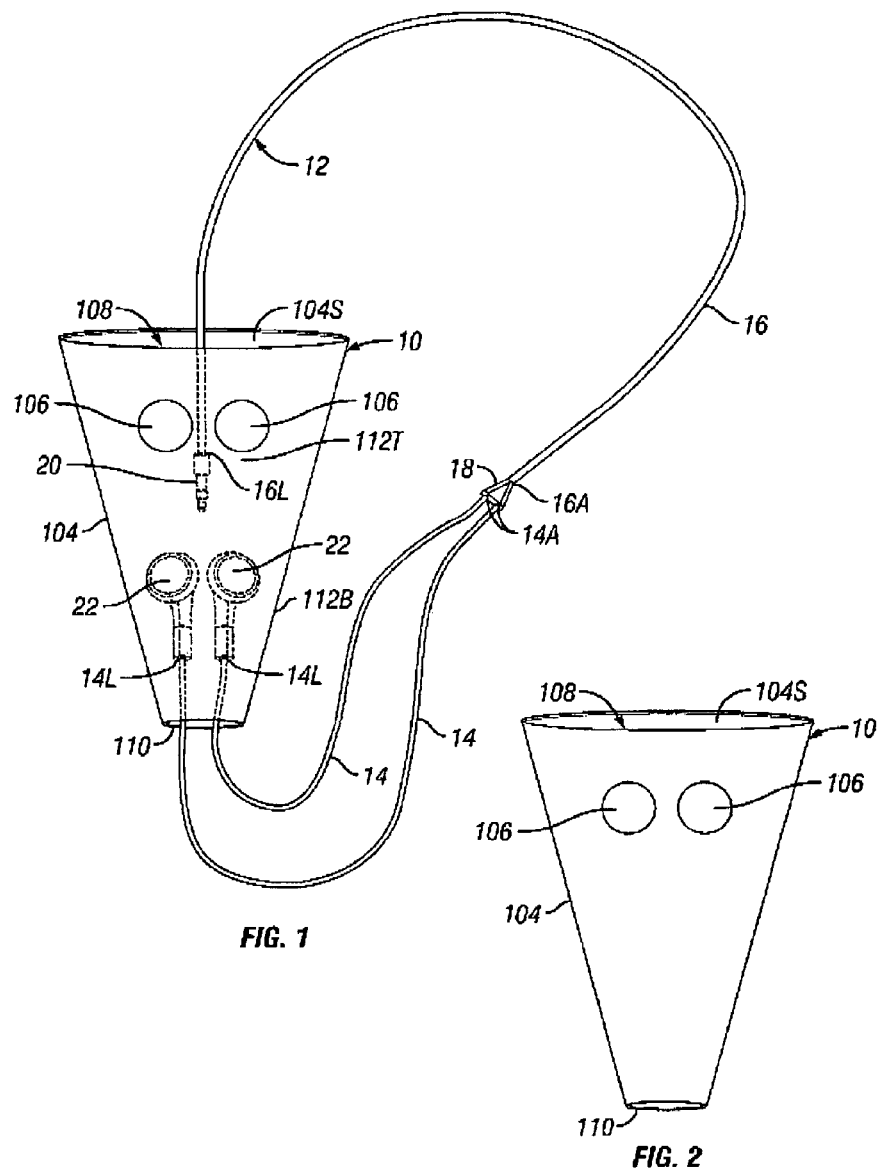
FIG. 1 is a diagrammatic perspective view from the front of the present invention, showing a sleeve storing a Y-shaped cord, presented in broken lines inside the sleeve.
FIG. 2 is a diagrammatic perspective view from the front of the sleeve.

FIG. 2 illustrates a sleeve 10 for preventing the entanglement of a Y-cord (Y-shaped cord) when the Y-cord is used or stored. The sleeve 10 is a triangular-shaped tube with an open bottom end 110, an open top end 108 and a conical peripheral sidewall 104 with a pair of interior sides 104S, creating a conduit for the Y-cord. The bottom end 110 is smaller than the top end 108, the top end 108 tapering toward the bottom end 110. The sleeve 10 has a plurality of fasteners 106, having at least a single fastener 106. The fastener 106 is attached to, or otherwise built into the sleeve 10 onto the sidewall 104 and when closed, selectively pinches a first side 104S of the sidewall 104 to a second side of the sidewall 104 opposed to the first portion 104S, creating separate pathways within the sleeve 10.

The fastener 106 is a two-part fastener that has a pair of parts, such as, for example, but not limited to, a snap, a magnetic fastener, a button with a buttonhole, a hook and loop fastener, a hook and eye fastener, a molded two-part connector or a latch that closes by connecting the pair of parts. The sleeve 10 is made from a flexible material, such as, for example, fabric, plastic, leather, or a combination of materials.

FIG. 1 further illustrates how the Y-cord 12 is stored in a closed loop in the sleeve 10. A Y-cord 12 is a cord, generally used in association with an electronic device, shaped like the letter "Y," having a pair of top cords 14 in a V-shape, a junction 18, and a single bottom cord 16, forming the stem of the "Y." The bottom cord 16 has an attached end 16A and a loose end 16L. The attached end 16A is attached to the junction 18. The pair of top cords 14 each has a pair of ends, a loose end 14L and an attached end 14A. The attached ends 14A meet and form a V-shape at the junction 18 and attach to the bottom cord 16 at the junction 18. When the Y-shaped cord is used in connection with a set of earphones, as in the illustration, a connecting plug 20 is at the loose end 16L of the bottom cord 16 and a pair of earbuds 22, each on the loose end 14L of the top cords 14. Other Y-cords have connectors, such as a plug, a USB (universal serial bus), a mini-USB, a micro-USB, an extended-USB, or a PS/2 on the loose ends of the Y-cord. Those of ordinary skill recognize that these are non-limiting examples of Y-shaped cords and that the invention is not limited to use with Y-cords with a set of earphones, but can be used with cords that have additional top cords or other variations in the Y-cord.

In the illustrated embodiment in FIG. 1, the sleeve 10 holds together the loose ends 14L of the top cords 14 that have the pair of earbuds 22 attached. The sleeve 10 is sufficient in size to contain the pair of earbuds 22 as well as the connecting plug 20 of the Y-cord 12. The open bottom end 110 is smaller than an earbud 22 and the earbud 22 cannot pass through the bottom end 110 but is retained in the sleeve 10. The fastener 106 is located substantially near the top end 108. The fastener 106 pinches the sidewalls of the sleeve 10 together to ensure that the ends will not fall out of the sleeve 10 by creating a bottom portion 112B to group and entrap the loose ends 14L, 16L of the top cords 14 and the bottom cord 16 of the Y-shaped cord 12. The fastener 106 maintains the grouping of the loose ends 14L, 16L to form a closed loop whose topographical form is tangle-resistant thereby ensuring few or no tangles in the Y-cord 12.

In FIG. 1, a pair of fasteners 106 create a top portion 112T having a plurality of pathways and a bottom portion 112B for maintaining the pair of earbuds 22 and the connecting plug 20. When closed, the fasteners 106 are positioned on the sleeve 10, near the open top end 108, substantially the same distance from the open top end 108, and pinch the sidewalls together to form a pathway in the top portion 112T of the sleeve 10 that is sufficiently large to contain the bottom cord 16, but smaller than the connecting plug 20 in the illustrated example. When closed, the pair of fasteners 106 prevents the connecting plug 20 from falling out of the sleeve 10. When used with types of Y-cords 12 other than earphones, the pathway in the top portion 112T demarcated by the pair of fasteners 106 is smaller than the connector at the loose end 16L of the bottom cord 16. The open bottom end 110 is sufficiently large to allow the connecting plug 20 to pass through, but not large enough for an earbud 22 to pass through. The pair of fasteners 106 create the bottom portion 112B to store the earbuds 22 in the sleeve 10 adjacent to the open bottom end 110.

Figure 4:
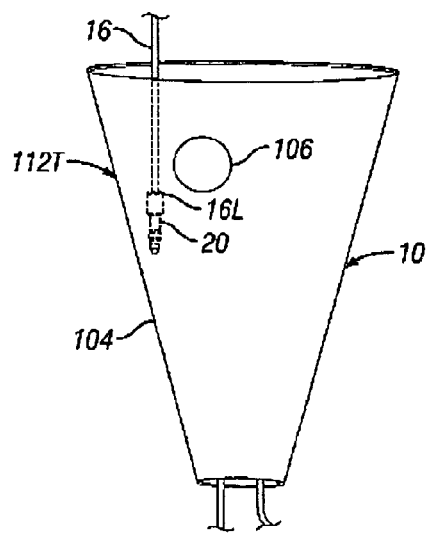
FIG. 4 is a diagrammatic perspective view from the front of the sleeve, illustrating the sleeve with a single fastener, showing only portions of the Y-shaped cord presented in broken lines inside the sleeve.

FIG. 4 shows another embodiment that uses the single fastener 106. When a single fastener 106 is used, the pathway in the top portion 112T is demarcated for the connecting plug 20, by placing on the sidewall 104, a first part of the fastener 106 close to the second part of the fastener 106 on the sidewall 104. The fastener 106 pinches the sidewall 104 together and forms the pathway in the top portion 112T with the sidewall 104 that is sufficiently large for the bottom cord 16 to pass through but not large enough for the connecting plug 20 or similar connector to pass through.

Referring to FIG. 1, to install the sleeve 10 on the Y-cord 12, the loose end 16L of the bottom cord 16 of the Y-cord 12 with the connecting plug 20 is placed into the open top end 108 and pulled through, passing out of the open bottom end 110 in the sleeve 10. The loose ends 14L of the top cords 14 with the earbuds 22 are pulled into the sleeve 10 and remain in the bottom portion 112B towards the open bottom end 110, but not passing through the bottom end 110. This allows the earbuds 22 to be retained in the sleeve 10. The loose end 16L of the bottom cord with the connecting plug 20 then is placed again into the open top end 108 without passing it through the bottom end 110. The fastener 106 is closed to pinch the opposed interior sides 104S of the peripheral sidewall 104, entrapping the connecting plug 20 in the bottom portion 112B above the earbuds 22. The closed fastener 106 prevents the earbuds 22 and plug 20 from falling out the open top end 108 by entrapping the loose ends of the cords within the sleeve 10. When two fasteners 106 are available, the loose end 16L of the bottom cord is placed between the two fasteners 106 and when the two fasteners 106 are closed a pathway for the bottom cord 16 is created between the fasteners 106.

Referring to FIG. 4, to install the sleeve 10 with a single fastener 106 on the Y-cord 12, the procedure as described hereinabove is followed except the loose end 16L of the bottom cord with the connecting plug 20 then is placed again into the open top end 108 and into the bottom portion 112B demarcated by the first part of the fastener 106 placed on the sidewall 104 close to the second part of the fastener on the sidewall 104, pinching the opposed sides of the sidewall 104 together and forming the pathway such that the bottom cord 16 passes through but not large enough for the connecting plug 20 or similar connector attached to the loose end 16L to pass through. The fastener 106 is closed to pinch the interior sides 104S of the peripheral sidewall 104, entrapping the connecting plug 20 in the bottom portion 112B above the earbuds 22.

Figure 3:
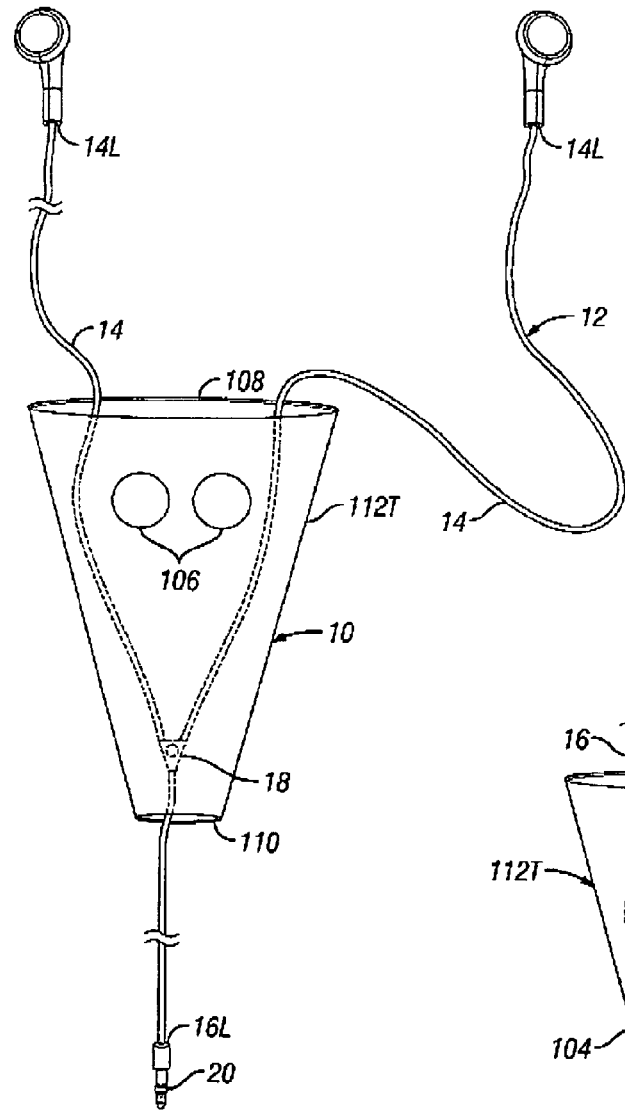
FIG. 3 is a diagrammatic perspective view from the front of the sleeve, illustrating the Y-shaped cord, presented in broken lines inside the sleeve, in use with the sleeve stored at a junction of the Y-shaped cord.

FIG. 3 shows the Y-cord 12 in use with the sleeve 10 conveniently stored on the Y-cord 12, not interfering with the Y-cord 12 functioning and easily retrieved when needed. The loose ends 14L, 16L of the Y-cord 12 are removed from the sleeve 10 by opening the fastener 106 106 and pulling through the open top end 108. Without completely removing the Y-cord 12, the fasteners 106 are closed above the junction 18 of the Y-cord 12, separating the top cords 14 from each other by positioning the fastener 106 in between the top cords 14. The fastener 106 retains the junction 18 within the sleeve 10. The fastener 106 separates the top cords 14. The loose end 16L with the connecting plug 20 is removed from the top portion 112T demarcated by the fasteners 106 and is free to connect to an electronic device. When the sleeve 10 has two fasteners 106, the top cords 14 are optionally separated by both fasteners 106. When the sleeve 10 has a single fastener as show in FIG. 4, the fastener 106 is positioned between the two top cords 14, separating the two top cords 14.

The present invention provides a simple method of management to prevent tangled Y-cords by separating the loose ends 14L, 16L of the Y-cord 12 and forming the closed loop of the Y-cord outside the sleeve 10. FIG. 1 demonstrates how to use the sleeve 10 to manage the Y-cord 12, for example, on a set of Y-cord earphones, to prevent entanglement. The user places the loose end 16L of the bottom cord 16 with the connecting plug 20 into the open top end 108 and pulls it through, passing it through the open bottom end 110. The user pulls the loose ends 14L of the top cords 14 with the earbuds 22 into the sleeve 10 through the open top end 108 down into the bottom portion 112B near the open bottom end 110. The opening on the open bottom end 110 is smaller than an earbud 22, so neither earbud 22 passes through but it is retained inside the sleeve 10. The user takes the loose end 16L of the bottom cord 16 of the Y-cord 12 and again places it into the open top end 108, but without passing it through the open bottom end 110. The user closes the fasteners 106, pinching the opposed interior sides 104S of the peripheral sidewall 104 together, entrapping the connecting plug 20 in the pathway in the portion 112T above the earbuds 22. All three loose ends 14L, 16L of the Y-cord 12 are now entrapped in the sleeve 10 to form the closed loop with the Y-cord 12 external to the sleeve 10 between the open top end 108 and open bottom end 110. If the Y-cord 12 does tangle when in the closed loop, the topology of the closed loop makes untangling the Y-cord simpler and quicker than if the ends were loose.

When the user desires to use the Y-cord 12, as illustrated in FIG. 3, the user opens the fastener 106 and removes the loose end 16L of the bottom cord 16 from the sleeve 10. The user pulls the loose ends 14L of the top cords 14 out of the sleeve 10 without removing the Y-cord 12. The user closes the fastener 106, separating the top cords 14 and retaining the junction 18 on the Y-cord 12 in the sleeve 10. The user plugs in the connecting plug 20 extending from the open bottom end 110 and places the earbuds 22 attached to the loose ends 14L of the top cords 14 into the user's ears. When the user finishes using the Y-cord 12, the user repeats the method as illustrated in FIG. 1 to store the Y-cord 12, placing the loose ends 14L, 16L into the sleeve 10 and repeating the actions as described previously hereinabove.

In conclusion, herein is presented a sleeve for preventing the entanglement of a Y-shaped cord when the Y-shaped cord is used or stored. The invention is illustrated by example in the drawing figures, and throughout the written description. It should be understood that numerous variations are possible, while adhering to the inventive concept. Such variations are contemplated as being a part of the present invention.

What is claimed is:

1. A sleeve for preventing entanglement of a Y-cord having a pair of top cords and a bottom cord, the top cords joined to the bottom cord, each cord having a loose end, comprising:
   a peripheral sidewall forming a tube having an open top end, and an open bottom end that is smaller than the open top end, the open bottom end and open top end creating a conduit for selectively grouping the loose ends of the Y-cord therein;
   at least one fastener attached to the sidewall, located between the open top end and open bottom end, for selectively pinching together opposed portions of the peripheral sidewall to create separate pathways for the cords between the open top end and open bottom end to selectively group the loose ends of the Y-cord within the conduit, and selectively allowing the loose ends to be removed from the conduit for use.

2. The sleeve as described in claim 1, wherein the fastener entraps the loose ends of the top and bottom cords of the Y-cord so that the Y-cord outside of the sleeve forms a closed loop between the open top end and open bottom end.

3. The sleeve as described in claim 2, wherein the sleeve is generally triangular-shaped, having a top portion near the open top end tapering to a bottom portion near the smaller open bottom end.

4. The sleeve as described in claim 3, wherein the smaller open bottom end of the sleeve prevents the loose end of the bottom cords from passing through the sleeve.

5. The sleeve as described in claim 4, wherein the sleeve has a top portion above the fastener and toward the open top end, and a bottom portion below the fastener and toward the open bottom end, and wherein the loose ends of the cords selectively are grouped in the bottom portion for storage of the Y-cord.

6. The sleeve as described in claim 5, wherein the Y-cord has a junction that joins the top cords to the bottom cord, and once the ends of the Y-cord are removed from the sleeve for use, the fastener can be closed to maintain the junction within the sleeve.

7. The sleeve as described in claim 6, where the Y-cord is a set of earphones, having a pair of earbuds at the loose ends of the top cord, and having a connecting plug at the loose end of the bottom cord, and wherein the plug and earbuds are selectively grouped in the bottom portion by closing the fastener for storage of the Y-cord, and wherein the fastener is opened for removing the loose ends for use of the Y-cord, and wherein the fastener is then closed for entrapping the junction inside the sleeve during use of the Y-cord.

8. The sleeve as described in claim 7, wherein the fastener is a pair of fasteners, both located at substantially the same distance from the open top end and open bottom end.

9. A sleeve for preventing entanglement of a set of earphones having a pair of earbuds and a connecting plug, disposed on a Y-cord having a pair of top cords, each with a loose end and an earbud attached to the loose end, and a bottom cord, with a loose end and a connecting plug attached to the loose end, comprising:

a peripheral sidewall forming a tube having an open top end, and an open bottom end that is smaller than the top open end, the bottom open end and top open end creating a conduit for selectively grouping the loose ends of the set of earphones therein; and at least one fastener attached to the sidewall, located between the top open end and bottom open end, for selectively pinching together opposed portions of the peripheral sidewall to create separate pathways for the cords between the top open end and bottom open end to selectively group the pair of earbuds and the connecting plug within the conduit, and selectively allowing the loose ends to be removed from the conduit for use.

10. The sleeve as described in claim 9, wherein the fastener entraps the loose ends of the plurality of cords of the Y-cord so that the Y-cord outside of the sleeve forms a closed loop between the top open end and bottom open end.

11. The sleeve as described in claim 10, wherein the sleeve is generally triangular-shaped, having a top portion near the open top end tapering to a bottom portion near the smaller open bottom end.

12. The sleeve as described in claim 11, wherein the smaller bottom open end of the sleeve prevents the earbud on the Y-cord from passing through the sleeve.

13. The sleeve as described in claim 12, wherein the sleeve has a top portion above the fastener and toward the top open end, and a bottom portion below the fastener and toward the bottom open end, and wherein the pair of earbuds and the connecting plug are grouped in the bottom portion for storage of the Y-cord.

14. The sleeve as described in claim 13, wherein the Y-cord has a junction that joins the top cords to the bottom cords, and once the pair of earbuds and connecting plug are removed from the sleeve for use, the fastener can be closed to retain the junction within the sleeve.

15. A method of managing a Y-cord having a pair of top cords and a bottom cord, the top cords joined to the bottom cord, each cord having a loose end, using a sleeve having a peripheral sidewall having an open top end, a smaller open bottom end, and forming a tube therebetween, at least one fastener configured on to the sidewall for selectively pinching the tube created by the sidewall, comprising:

passing the bottom cord through the sleeve by placing the loose end of the bottom cord into the open top end and pulling it through the smaller open bottom end;

pulling the loose ends of the top cords into the sleeve through the open top end down into the bottom portion by pulling the loose end of the bottom cord;

placing the loose end of the bottom cord again into the open top end without passing it through the smaller open bottom end; and closing the fastener to pinch the peripheral sidewall together to entrap the loose ends of the cords within the sleeve.

16. The method of managing a Y-cord as described in claim 15, wherein the step of closing the fastener to pinch the peripheral side wall further comprises forming a closed loop with the Y-cord external to the sleeve between the open top end and the open bottom end.

17. The method of managing a Y-cord as described in claim 16, wherein the fastener comprises two fasteners.

18. The method of managing a Y-cord as described in claim 17, wherein the step of closing the fastener further comprises creating a top portion of the sleeve and a bottom portion of the sleeve and containing the loose ends of the Y-cord in the bottom portion.

19. The method of managing a Y-cord as described in claim 18, wherein the steps as recited are followed by the steps of:

opening the fastener;

removing the loose end of the bottom cord from the open top end;

and pulling the loose ends of the top cords out of the sleeve and using the Y-cord.

20. The method of managing a Y-cord as described in claim 19, wherein the Y-cord has a junction joining the top cords to the bottom cord, and wherein the steps as recited are followed by the step of closing the fastener retains the junction inside the sleeve.

* * * * *